(12) United States Patent
Gao et al.

(10) Patent No.: US 6,393,364 B1
(45) Date of Patent: May 21, 2002

(54) DETERMINATION OF CONDUCTIVITY IN ANISOTROPIC DIPPING FORMATIONS FROM MAGNETIC COUPLING MEASUREMENTS

(75) Inventors: Li Gao, Missouri City; Stanley C. Gianzero, Austin, both of TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/583,184

(22) Filed: May 30, 2000

(51) Int. Cl.[7] ............................. G01V 1/40; G01V 9/00
(52) U.S. Cl. ........................ 702/7; 702/10; 324/339
(58) Field of Search ......................... 324/339, 338, 324/340, 343, 346, 336; 702/7, 10

(56) References Cited

U.S. PATENT DOCUMENTS

| | | | |
|---|---|---|---|
| 5,115,198 A | * 5/1992 | Gianezero et al. | 324/339 |
| 5,329,448 A | * 7/1994 | Rosthal | 702/7 |
| 5,886,526 A | 3/1999 | Wu | 324/338 |
| 5,966,013 A | 10/1999 | Hagiwara | 324/339 |
| 5,999,883 A | 12/1999 | Gupta et al. | 702/7 |

\* cited by examiner

*Primary Examiner*—Edward Lefkowitz
*Assistant Examiner*—Sobhash Zaveri
(74) *Attorney, Agent, or Firm*—Conley, Rose & Tayon, P.C.

(57) ABSTRACT

A method is disclosed for the determination of horizontal resistivity, vertical resistivity, dip and strike angles of anisotropic earth formations surrounding a wellbore. Electromagnetic couplings among a plural of triad transmitters and triad receivers are measured. Each triad transmitter/receiver consists of coil windings in three mutually orthogonal axes. These measured signals are used to generate initial estimates of the dip angle and strike angle of the formation as well as the anisotropy coefficient and the horizontal resistivity of the formation. An iterative algorithm is then applied using these quantities to finally arrive at more accurate estimates that approach the true values in the formation.

19 Claims, 2 Drawing Sheets

DETERMINATION OF CONDUCTIVITY IN ANISOTROPIC DIPPING FORMATIONS FROM MAGNETIC COUPLING MEASUREMENTS

BACKGROUND

1. Field of the Invention

The present invention generally relates to the measurement of electrical characteristics of formations surrounding a wellbore. More particularly, the present invention relates to a method for determining horizontal and vertical resistivities in anisotropic formations while accounting for the dip and stike angle of the formation.

2. Description of the Related Art

The basic principles and techniques for electromagnetic logging for earth formations are well known. Induction logging to determine the resistivity (or its inverse, conductivity) of earth formations adjacent a borehole, for example, has long been a standard and important technique in the search for and recovery of subterranean petroleum deposits. In brief, the measurements are made by inducing eddy currents to flow in the formations in response to an AC transmitter signal, and then measuring the appropriate characteristics of a receiver signal generated by the formation eddy currents. The formation properties identified by these signals are then recorded in a log at the surface as a function of the depth of the tool in the borehole.

It is well known that subterranean formations surrounding an earth borehole may be anisotropic with regard to the conduction of electrical currents. The phenomenon of electrical anisotropy is generally a consequence of either microscopic or macroscopic geometry, or a combination thereof, as follows.

In many sedimentary strata, electrical current flows more easily in a direction parallel to the bedding planes, as opposed to a direction perpendicular to the bedding planes. One reason is that a great number of mineral crystals possess a flat or elongated shape (e.g., mica or kaolin). At the time they were laid down, they naturally took on an orientation parallel to the plane of sedimentation. The interstices in the formations are, therefore, generally parallel to the bedding plane, and the current is able to easily travel along these interstices which often contain electrically conductive mineralized water. Such electrical anisotropy, sometimes called microscopic anisotropy, is observed mostly in shales.

Subterranean formation are often made up of a series of relatively thin beds having different lithological characteristics and, therefore different resistivities. In well logging systems, the distances between the electrodes or antennas are great enough that the volume involved in a measurement may include several such thin beds. When individual layers are neither delineated nor resolved by a logging tool, the tool responds to the formation as if it were a macroscopically anisotropic formation. A thinly laminated sand/shale sequence is a particularly important example of a macroscopically anisotropic formation.

If a sample is cut from a subterranean formation, the resistivity of the sample measured with current flowing parallel to the bedding planes is called the transverse or horizontal resistivity $\rho_H$. The inverse of $\rho_H$ is the horizontal conductivity $\sigma_H$. The resistivity of the sample measured with a current flowing perpendicular to the bedding plane is called the longitudinal or vertical resistivity, $\rho_V$, and its inverse the vertical conductivity $\sigma_V$. The anisotropy coefficient $\lambda$ is defined as: $\lambda = \sqrt{\sigma_h/\sigma_v}$.

In situations where the borehole intersects the formation substantially perpendicular to the bedding planes, conventional induction and propagation well logging tools are sensitive almost exclusively to the horizontal component of the formation resistivity. When the borehole intersects the bedding planes at an angle (a deviated borehole) the tool readings contain an influence from the vertical and horizontal resistivities. This is particularly true when the angle between the borehole and the normal to the bedding places is large, such as in directional or horizontal drilling, where angles near 90° are commonly encountered. In these situations, the influence of vertical resistivity can cause discrepancies between measurements taken in the same formation in nearby vertical wells, thereby preventing a useful comparison of these measurements. In addition, since reservoir evaluation is typically based on data obtained from vertical wells, the use of data from wells drilled at high angles may produce erroneous estimates of formation reserve, producibility, etc. if proper account is not taken of the anisotropy effect.

There have been proposed a number of methods to determine vertical and horizontal resistivity near a deviated borehole. Hagiwara (U.S. Pat. No. 5,966,013) disclosed a method of determining certain anisotropic properties of formation using propagation tool without a priori knowledge of the dip angle. In U.S. Pat. No. 5,886,526, Wu described a method of determining anisotropic properties of anisotropic earth formations using multi-spacing induction tool with assumed functional dependence between dielectric constants of the formation and its horizontal and vertical resistivity. Gupta et al. (U.S. Pat. No. 5,999,883) utilized a triad induction tool to arrive at an approximate initial guesses for the anisotropic formation parameters. Moran and Gianzero (Geophysics, Vol. 44, P. 1266, 1979) proposed using a tri-axial tool of zero spacing to determine dip angle. Later the spacing was extended to finite size by Gianzero et al. (U.S. Pat. No. 5,115,198) using a pulsed induction tool. The above references are hereby incorporated herein by reference.

These attempts to determine vertical and horizontal resistivity around a deviated borehole have thus far not provided sufficient accuracy for formations having a high degree of anisotropy. A new technique is therefore needed.

SUMMARY OF THE INVENTION

The above-described problems are in large part addressed by an iterative method for determining electrical conductivity in an anisotropic dipping formation. The iterative method corrects for the skin effect to high orders while determining all relevant formation parameters. This method may be applied to a tri-axial induction sonde operating in continuous wave (CW) mode. In one embodiment, the method includes (1) measuring a magnetic coupling between transmitter coils and receiver coils of a tool in a borehole traversing the formation; (2) obtaining from the measured coupling a strike angle between the tool and the formation; (3) obtaining from the measured coupling an initial dip angle between the tool and the formation; (4) obtaining from the measured coupling an initial anisotropic factor of the formation; (5) obtaining from the measured coupling an initial horizontal conductivity of the formation; (6) determining an iterative anisotropic factor from the measured coupling, the strike angle, the latest dip angle, and the latest anistropic factor; (7) determining an iterative horizontal conductivity from the measured coupling, the strike angle, the latest iterative anisotropic factor, and the latest dip angle; and (8) determining an iterative dip angle from the measured coupling, the latest iterative anisotropic factor, and the latest iterative horizontal conductivity. The steps of determining an iterative anisotropic factor, determining an iterative horizontal conductivity, and determining an iterative dip angle are preferably repeated a number of times that minimizes an overall residual error.

The disclosed method may provide the following advantages in determining the formation parameters of anisotropic earth formations: (1) a priori knowledge of the dip angle is unnecessary and can be one of the outputs of the method; (2) no assumed relationship between formation resistivity and dielectric constant is necessary; (3) complex electronics for pulsing the transmitter coils may be eliminated since this method is applicable to a triad induction sonde running in CW mode; (4) preliminary results indicate that the disclosed method yields more accurate estimates of all electrically relevant formation parameters in the earth formation.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Terminology

It is noted that the terms horizontal and vertical as used herein are defined to be those directions parallel to and perpendicular to the bedding plane, respectively.

Tool Configuration

Figure 1:
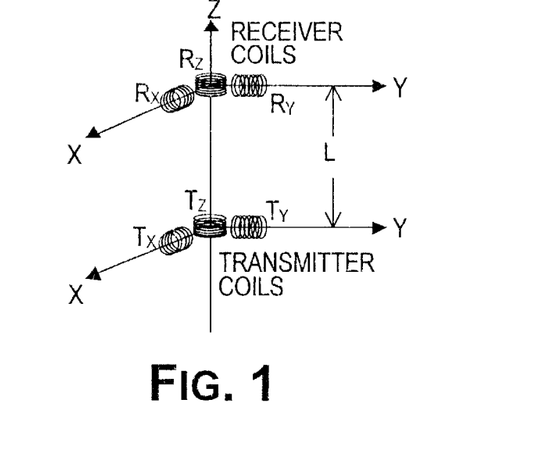
FIG. 1 shows the coil configuration of a triaxial induction tool.

Turning now to the figures, FIG. 1 shows a conceptual sketch of a coil arrangement for a downhole induction tool. A triad of transmitter coils $T_x$, $T_y$ and $T_z$, each oriented along a respective axis, is provided, as is a similarly oriented triad of receiver coils $R_x$, $R_y$ and $R_z$. For clarity, it is assumed that the three coils in each triad represent actual coils oriented in mutually perpendicular directions, with the z-axis corresponding to the long axis of the tool. However, it is noted that this coil arrangement can be "synthesized" by performing a suitable transformation on differently oriented triads. Such transformations are described in depth in U.S. patent application Ser. No. 09/255,621 entitled "Directional Resistivity Measurements for Azimutal Proximity Detection of Bed Boundaries" and filed Feb. 22, 1999 by T. Hagiwara and H. Song, which is hereby incorporated herein by reference.

Each of the coils in the transmitter triad is parallel to the corresponding coil in the receiver triad and is spaced away from the corresponding coil in the z-axis direction. The distance between the corresponding coils is labeled L. It is noted that the downhole tool may have additional transmitter or receiver triads to provide multiple transmitter-receiver spacing L values. Such configurations may advantageously provide increased accuracy or additional detail useful for analyzing the formation structure.

System Model

Generally, a formation model is used to interpret the tool measurements. The model used herein is a unixial anisotropy model. This model assumes that the formation is isotropic in the horizontal direction (parallel to the bedding plane) and anisotropic in the vertical direction (perpendicular to the bedding plane). Setting up a formation coordinate system having the z-axis perpendicular to the bedding plane and the x- and y-axes parallel to the bedding plane allows a conductivity tensor to be expressed as:

$$\sigma = \begin{bmatrix} \sigma_h & 0 & 0 \\ 0 & \sigma_h & 0 \\ 0 & 0 & \sigma_v \end{bmatrix} \quad (1)$$

Figure 2:
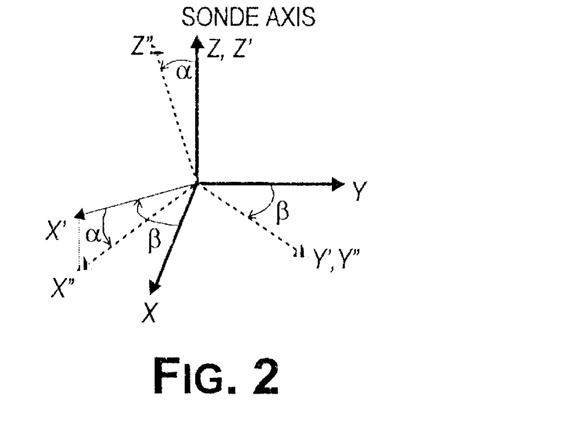
FIG. 2 demonstrates a rotational transformation definition.

The axes of the formation coordinate system typically do not correspond to the axes of the tool coordinate system. However, a rotational transformation from one to the other can be defined. FIG. 2 shows a transformation from the tool coordinate system to the formation coordinate system. The tool coordinate system (x,y,z) is first rotated about the z-axis by an angle $\beta$, hereafter termed the strike angle. The intermediate coordinate system (x',y',z'=z) thus formed is then rotated about the y' axis by an angle $\alpha$, hereafter termed the dip angle to obtain the formation coordinate system (x",y"=y',z").

Any vector v" in the formation coordinate system can be expressed in the tool coordinate system as:

$$v = Rv'' \quad (2)$$

where the rotational transform matrix is:

$$R = \begin{bmatrix} \cos\alpha\cos\beta & \cos\alpha\sin\beta & -\sin\alpha \\ -\sin\alpha & \cos\beta & 0 \\ \sin\alpha\cos\beta & \sin\alpha\sin\beta & \cos\alpha \end{bmatrix} \quad (3)$$

Derivation of Equations

Now that the rotational transformation has been defined, attention is directed to the induction tool measurements. When a voltage is applied to one of the transmitter coils, a changing magnetic field is produced. The magnetic field interacts with the formation to induce a voltage in the receiver coils. Each of the three transmitter coils is excited in turn, and the voltage produced at each of the three receiver coils is measured. The nine measured voltages indicate the magnetic coupling between the transmitter-receiver triad pair. The equations for the measured signals will be derived and manipulated to solve for the strike angle $\beta$, the dip angle $\alpha$, the horizontal conductivity $\sigma_h$, and the vertical anisotropy $\lambda$.

In the most general case according to Moran and Gianzero (Geophysics, Vol. 44, P. 1266, 1979), the magnetic field H in the receiver coils can be represented as a coupling matrix C in the form:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix} \quad (4)$$

where $H_x$, $H_y$, $H_z$ and $M_x$, $M_y$, $M_z$, are the field components at the receivers and magnetic moment components at the transmitters, respectively. (Magnetic moment is calculated $M_T = A_T N_T I_T$, where $A_T$ is the transmitter area, $N_T$ is the number of turns in the transmitter coil, and $I_T$ is the transmitter current. The direction of the magnetic moment is perpendicular to the plane of the coil). If the coupling matrix is specified in terms of the formation coordinate system, the measured magnetic field strengths in the receiver coils are obtained by (Moran and Gianzero, Geophysics, Vol. 44, P. 1266, 1979):

$$H = (R^{-1}CR)M = C'M \quad (5)$$

where H and M are measured in the sonde coordinate system.

Assuming that the tool is oriented so that the strike angle $\beta$ is 0, it can be shown that for the uniaxial anisotropy model the full coupling matrix C' at the receiver coils (x=0=y, z=L) simplifies to $$C'' = \begin{bmatrix} C_{xx} & 0 & C_{xz} \\ 0 & C_{yy} & 0 \\ C_{zx} & 0 & C_{zz} \end{bmatrix} \quad (6)$$

The theoretical values of the coupling matrix elements are ($C_{ij}=C_{ji}$):

$$C_{xx} = \frac{1}{4\pi L^3}\left[k_h^2 L^2 \cos^2\alpha \cdot e^{ik_h L} - ik_h L\left(\frac{e^{ik_h LA} - e^{ik_h L}}{\sin^2\alpha}\right) + (3\sin^2\alpha - 1)(1 - ik_h L)e^{ik_h L}\right] \quad (7)$$

$$C_{xy} = C_{yz} = 0 \quad (8)$$

$$C_{xz} = \frac{-\sin\alpha\cos\alpha}{4\pi L^3}e^{ik_h L}[3(1 - ik_h L) - k_h^2 L^2] \quad (9)$$

$$C_{yy} = \frac{1}{4\pi L^3}\left[\frac{k_h^2 L^2}{\lambda A^2}e^{ik_h L} + ik_h L\left(\frac{e^{ik_h LA} - e^{ik_h L}}{\sin^2\alpha}\right) - (1 - ik_h L)e^{ik_h L}\right] \quad (10)$$

$$C_{zz} = \frac{1}{4\pi L^3}e^{ik_h L}[k_h^2 L^2 \sin^2\alpha + (1 - ik_h L)(3\cos^2\alpha - 1)] \quad (11)$$

where
$k_h = \sqrt{\omega\mu\sigma_h}$ = horizontal wave number
$\omega = 2\pi f$ = angular frequency
$\mu = \mu_0 = 4\pi \times 10^{-7}$ henry/m = magnetic permeability
$\lambda = \sqrt{\sigma_h/\sigma_v}$ = anisotropy coefficient
$A = \sqrt{\sin^2\alpha + \lambda^2 \cos^2\alpha}/\lambda$ = anisotropic factor In terms of the elements of the coupling matrix C', the six independent measurements for all the possible couplings between all transmitter-receiver pairs are expressed as ($T_i R_j = T_j R_i$):

$$T_x R_x = M/2\{[(c_{xx}+c_{zz})+(c_{xx}-C_{zz})\cos 2\alpha + 2C_{xz} \sin 2\alpha]\cos^2\beta + 2C_{yy} \sin^2\beta\} \quad (12)$$

$$T_y R_y = M/2\{[(C_{xx}+C_{zz})+(C_{xx}-C_{zz})\cos 2\alpha + 2C_{xz} \sin 2\alpha]\sin^2\beta + 2C_{yy} \cos^2\beta\} \quad (13)$$

$$T_z R_z = M/2[(C_{xx}+C_{zz})+(C_{zz}-C_{xx})\cos 2\alpha - 2C_{xz} \sin 2\alpha] \quad (14)$$

$$T_x R_y = M/4[(C_{xx}+C_{zz})+(C_{xx}-C_{zz})\cos 2\alpha + 2C_{xz} \sin 2\alpha - 2C_{yy}]\sin 2\beta \quad (15)$$

$$T_z R_x = M/2[(C_{zz}+C_{xx})\sin 2\alpha + 2C_{xz} \cos 2\alpha]\cos\beta \quad (16)$$

$$T_z R_y = M/2[(C_{zz}-C_{xx})\sin 2\alpha + 2C_{xz} \cos 2\alpha]\sin\beta \quad (17)$$

These measurements are made by taking the ratio of the transmit and receive voltage signals, e.g. $T_x R_y = K V_{Ry}/V_{Tx}$, where K is a real-valued calibration constant theoretically equal to $A_T N_T A_R N_R (\omega\mu)^2/4\pi L$, where $A_R$ is the area of the receive coil, and $N_R$ is the number of turns of the receive coil.

Explicitly solving the last four of the above equations results in the following expressions for the measured cross-coupling fields:

$$T_x R_y = \frac{M\sin 2\beta}{8\pi L^3}\left[k_h^2 L^2\left(e^{ik_h L} - \frac{e^{ik_h LA}}{\lambda^2 A}\right) - ik_h L(e^{ik_h LA} - e^{ik_h L})\frac{(1+\cos^2\alpha)}{\sin^2\alpha}\right] \quad (18\text{-}a)$$

$$T_z R_x = \frac{M\cos\beta\sin 2\alpha}{8\pi L^3 \sin^2\alpha}ik_h L(e^{ik_h LA} - e^{ik_h L}) \quad (18\text{-}b)$$

$$T_z R_y = \frac{M\sin\beta\sin 2\alpha}{8\pi L^3 \sin^2\alpha}ik_h L(e^{ik_h LA} - e^{ik_h L}) \quad (18\text{-}c)$$

$$T_z R_z = \frac{M}{4\pi L^3}[2e^{ik_h L}(1 - ik_h L) - ik_h L(e^{ik_h LA} - e^{ik_h L})] \quad (18\text{-}d)$$

To make practical use of the above equations, the real component is ignored and the imaginary (reactive) component is simplified by finding the limit as the transmitter-receiver spacing approaches zero, i.e., L→0. Doing this simplifies the reactive components of the measured signal equations (18-a,b,c) to:

$$(T_x R_y)_x \rightarrow \frac{M\sin 2\beta\sin\alpha}{8\pi\lambda^2\delta_h^3}(1 - \lambda^2) \quad (19\text{-}a)$$

$$(T_z R_x)_x \rightarrow \frac{M\cos\beta\sin 2\alpha}{8\pi\lambda^2\delta_h^3}(1 - \lambda^2) \quad (19\text{-}b)$$

$$(T_z R_y)_x \rightarrow \frac{M\sin\beta\sin 2\alpha}{8\pi\lambda^2\delta_h^3}(1 - \lambda^2) \quad (19\text{-}c)$$

where $\delta_h = \sqrt{2/\omega\mu\sigma_h}$ is the skin depth associated with horizontal conductivity. From these equations, one arrives at the practical equations for the determination of dip and strike angles:

$$\beta = \tan^{-1}\left[\frac{(T_z R_y)_x}{(T_z R_x)_x}\right] \quad (20)$$

$$\alpha_{a1} = \tan^{-1}\left[\sqrt{\left[\frac{(T_x R_y)_x}{(T_z R_x)_x}\right]^2 + \left[\frac{(T_x R_y)_x}{(T_z R_y)_x}\right]^2}\right] \quad (21)$$

It is noted that the strike angle $\beta$ thus obtained is exact while the dip angle $\alpha$ is only an approximation because Equations (19a–c) are valid only in the zero-spacing limit. The subscript $\alpha 1$ denotes that this is the first approximation of the apparent dip angle.

With the strike angle $\beta$ and the estimated dip angle $\alpha$, estimates of the horizontal conductivity $\sigma_h$ and anisotropy factor A can be obtained via the following observation.

When a power series expansion is used for the exponential terms in equation (18-b), the first terms yield the following expressions for the real part $(T_zR_x)_R$ and imaginary part $(T_zR_x)_X$:

$$(T_zR_x)_R \approx \frac{M}{8\pi L^3} \frac{\cos\beta \sin 2\alpha}{\sin^2\alpha}(A^2-1)\left(\frac{L}{\delta_h}\right)^3 \quad (22)$$

$$(T_zR_x)_X \approx \frac{M}{8\pi L^3} \frac{\cos\beta \sin 2\alpha}{\sin^2\alpha}\left[-2(A-1)\left(\frac{L}{\delta_h}\right)^2 + (A^2-1)\left(\frac{L}{\delta_h}\right)^3\right] \quad (23)$$

Taking advantage of the fact that the second term in $(T_zR_x)_X$ is identical to $(T_zR_x)_R$, an equation that is skin-effect corrected to the first order can be written as:

$$(T_zR_x)_R - (T_zR_x) \approx \frac{M}{4\pi L^3} \frac{\cos\beta \sin 2\alpha}{\sin^2\alpha}(A-1)\left(\frac{L}{\delta_h}\right)^2 \quad (24)$$

Similarly with equation (18-d), for $T_zR_z$ one has:

$$(T_zR_z)_R - (T_zR_z)_X \approx \frac{M}{4\pi L^3} A\left(\frac{L}{\delta_h}\right)^2 \quad (25)$$

Equations (24) and (25) can be solved to obtain A and $\sigma_h$:

$$A \approx \frac{1}{1 + \frac{(T_zR_x)_X - (T_zR_x)_R}{(T_zR_z)_X - (T_zR_z)_R} \cdot \frac{\tan\alpha}{\cos\beta}} \quad (26)$$

$$\sigma_h \approx \frac{4\pi L}{M\omega\mu} \frac{[(T_zR_x)_X - (T_zR_x)_R]}{A} \quad (27)$$

Substituting the strike angle $\beta$ and the first estimate of the dip angle $\alpha_{\alpha 1}$ from Equations (20) and (21) yields the first estimates of the anisotropic factor $A_{\alpha 1}$ and the horizontal conductivity $\sigma_{h1}$, where the subscript $\alpha 1$ denotes the quantities are the first estimates of the apparent values:

$$A_{a1} \approx \frac{1}{1 + \frac{(T_zR_x)_X - (T_zR_x)_R}{(T_zR_z)_X - (T_zR_z)_R} \cdot \frac{\tan\alpha_{a1}}{\cos\beta}} \quad (28)$$

$$\sigma_{h1} \approx \frac{4\pi L}{M\omega\mu} \frac{[(T_zR_x)_X - (T_zR_x)_R]}{A_{a1}} \quad (29)$$

It is noted that the leading fraction may be replaced by a calibration coefficient $K_1$ for the tool.

Now that initial estimates have been obtained, the estimates can be iteratively improved. Examining the series expansion of all the measured fields reveals that $$(T_zR_x)_R = \frac{M}{8\pi L^3} \frac{\cos\beta\sin(2\alpha)}{\sin^2\alpha}\left\{ \begin{array}{l}(A^2-1)\left(\frac{L}{\delta_h}\right)^3 + \frac{2}{3}(1-A^3)\left(\frac{L}{\delta_h}\right)^4 + \\ \frac{1}{6}(A^4-1)\left(\frac{L}{\delta_h}\right)^5 + O[(L/\delta_h)^6]\end{array}\right\} \quad (30)$$

$$(T_zR_x)_X = \frac{M}{8\pi L^3} \frac{\cos\beta\sin(2\alpha)}{\sin^2\alpha}\left\{ \begin{array}{l}2(1-A)\left(\frac{L}{\delta_h}\right)^2 + (A^2-1)\left(\frac{L}{\delta_h}\right)^3 - \\ \frac{1}{6}(A^4-1)\left(\frac{L}{\delta_h}\right)^5 + O[(L/\delta_h)^6]\end{array}\right\} \quad (31)$$

Because the higher order terms do not cancel each other, Equations (24) and (25) are no longer correct. To remedy this problem, the extra skin-effect contribution may be subtracted from the left-hand side. Namely, the left-hand side of Equation (24) may be replaced by $(T_zR_x)_R-(T_zR_x)_X-\Gamma_{zx}$ where $\Gamma_{zx}$ is the higher order correction obtained from (30):

$$\Gamma_{zx} = \frac{M}{8\pi L^3} \frac{\cos\beta\sin 2\alpha_{a1}}{\sin^2\alpha_{a1}}\left[\frac{2}{3}(1-A_{a1}^3)\left(\frac{L}{\delta_{a1}}\right)^4 + \frac{1}{3}(1-A_{a1}^4)\left(\frac{L}{\delta_{a1}}\right)^5\right] \quad (32)$$

Similarly, the correction for $(T_zR_z)_R-(T_zR_z)_X$ can be derived:

$$\Gamma_{zz} = \frac{M}{4\pi L^3} \cdot \left[-\frac{1}{3}(1+2A_{a1}^3)\left(\frac{L}{\delta_{a1}}\right)^4 + \frac{(3+5A_{a1}^2)}{15}\left(\frac{L}{\delta_{a1}}\right)^5\right] \quad (33)$$

It is noted that the leading fraction in (32) and (33) may be replaced with a calibration coefficient $K_2$ and $2K_2$, respectively, for the tool. With these corrections, one gets better approximations for A and $\sigma_h$:

$$A_{a2} = \frac{1}{1 + \frac{(T_zR_x)_X - (T_zR_x)_R - \Gamma_{zx}}{(T_zR_z)_X - (T_zR_z)_R - \Gamma_{zz}} \cdot \frac{\tan\alpha_{a1}}{\cos\beta}} \quad (34)$$

$$\sigma_{h2} \approx \frac{4\pi L}{M\omega\mu} \frac{[(T_zR_x)_X - (T_zR_x)_R]}{A_{a2}} \quad (35)$$

The same "extend to a higher order" procedure can be applied to the other components of the measured fields in Equation (25). The end result is a more accurate equation for the dip angle:

$$\tan\alpha_a = \sqrt{\left[\frac{(T_xR_y)_R - (\Delta_{xy})_R}{(T_zR_x)_R - (\Delta_{zx})_R}\right]^2 + \left[\frac{(T_xR_y)_R - (\Delta_{xy})_R}{(T_zR_y)_R - (\Delta_{zy})_R}\right]^2} \quad (36)$$

It is noted that here the real part of the magnetic field (which is identical to the imaginary part of the measured voltages at the coils other than a constant factor) is used, hence the subscript R. The correction terms can be directly obtained from the $6^{th}$ order expansions of the corresponding coupling fields. The correction terms are:

$$(\Delta_{zx})_R = \frac{M}{8\pi L^3} \frac{\cos\beta\sin(2\alpha_a)}{\sin^2\alpha_a}\left[\frac{2}{3}(1-A_a^3)\left(\frac{L}{\delta_{ha}}\right)^4 + \frac{1}{6}(A_a^4-1)\left(\frac{L}{\delta_{ha}}\right)^5\right] \quad (37\text{-a})$$

$$(\Delta_{zy})_R = \frac{M}{8\pi L^3} \frac{\sin\beta\sin(2\alpha_a)}{\sin^2\alpha_a}\left[\frac{2}{3}(1-A_a^3)\left(\frac{L}{\delta_{ha}}\right)^4 + \frac{1}{6}(A_a^4-1)\left(\frac{L}{\delta_{ha}}\right)^5\right] \quad (37\text{-b})$$

$$(\Delta_{xy})_R = \frac{M\sin 2\beta}{2\pi L^3}\left[-P(\alpha_a)\left(\frac{L}{\delta_{ha}}\right)^4 + Q(\alpha_a)\left(\frac{L}{\delta_{ha}}\right)^5\right] \quad (37\text{-c})$$

where $\alpha_a$=Apparent dip angle $$\delta_{ha} = \sqrt{\frac{2}{\omega\mu\sigma_{ha}}} = \text{Apparent horizontal skin-depth}$$

$\sigma_{h\alpha}$=Apparent horizontal conductivity $$P(\alpha_a) = \frac{(A_a^3-1)}{6} \frac{(1+\cos^2\alpha_a)}{\sin^2\alpha_a} + \frac{A_a}{2} \frac{(A_a^2-\cos^2\alpha_a)}{\sin^2\alpha_a} - \frac{1}{2}$$

-continued $$Q(\alpha_a) = \frac{(A_a^4 - 1)}{24} \frac{(1 + \cos^2 \alpha_a)}{\sin^2 \alpha_a} + \frac{A_a^2}{6} \frac{(A_a^2 - \cos^2 \alpha_a)}{\sin^2 \alpha_a} - \frac{1}{6}$$

Property Determination Method

The above derivation has provided:

Eqn. (20) for the determination of the strike angle β,

Eqn. (21) for a first estimate of the dip angle α,

Eqn. (28) for a first estimate of the anisotropic factor A,

Eqn. (29) for a first estimate of the horizontal conductivity σ,

Eqn. (34) for an iterative estimate of the anisotropic factor A,

Eqn. (35) for an iterative estimate of the horizontal conductivity σ, and

Eqn. (36) for an iterative estimate of the dip angle α.

Eqn. (36) includes correction terms that are specified by Eqn. (37). The property determination approach built into Eqns (34)–(37) is believed to be unknown to the art.

Figure 3:
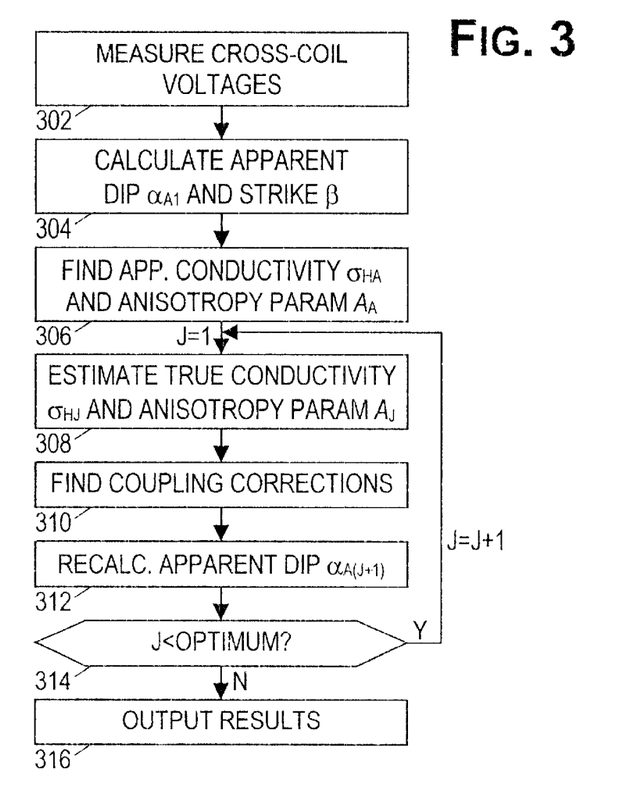
FIG. 3 shows a flow diagram for the disclosed method of determining formation parameters in a dipping anisotropic earth formation.

FIG. 3 shows an iterative method that uses the above equations to determine the dip and strike angles, the horizontal conductivity, and the anisotropy coefficient (calculated from the anisotropic factor). In block 302, the transmitter coils are activated and the voltages produced in the receiver coils are measured. The measured voltages are processed to determine the magnetic couplings between the coils. In block 304, the strike angle β is calculated per Eqn (20) and the first estimate of the dip angle $\alpha_{A1}$ is calculated per Eqn (21). In block 306, the first estimate of the anisotropic factor $A_A$ is calculated per Eqn (28) and the first estimate of the horizontal conductivity $\sigma_{hA}$ is calculated per Eqn (29).

Blocks 308 through 314 form a loop having a loop index J. Loop index J is initialized to 1 for the first iteration of the loop, and incremented by 1 for subsequent iterations of the loop.

In block 308, an iterative estimate of the anisotropic factor $A_J$ is calculated per Eqn (34) and an iterative estimate of the horizontal conductivity $\sigma_{hJ}$ is calculated per Eqn (35). In block 310, coupling correction terms are caculated per Eqns (37-a,b,c). In block 312, an iterative estimate of the dip angle $\alpha_{(J+1)}$ is calculated per Eqn (36) using the coupling correction terms found in block 310. In block 314, a test is made to determine if the optimum number of iterations has been performed, and if more iterations are needed, control returns to block 308. Otherwise. in block 316, the anisotropy coefficient λ is calculated from the latest estimates of the dip angle and anisotropic factor (refer to the definition of the anisotropic factor in Eqn (11)). The anisotropy coefficient λ is then output, along with the strike angle β, and the best estimates of the dip angle α and horizontal conductivity $\sigma_h$.

Analysis of Method

The effectiveness of the method is demonstrated in Table I where all apparent formation parameters are listed for each successive iteration. The true formation parameters are: dip angle α=45°, strike angle β=60°, anisotropy coefficient λ=2, and horizontal conductivity $\sigma_h$=5 S/m. The sonde is a triad 2C40 (notation means 2 coils spaced 40 inches apart) operating at 8 kHz.

TABLE I

Effect of iteration number for triad 2C40 in a dipping anisotropic formation.

| Iteration No. | Apparent Dip $\alpha_\alpha$ | Apparent λ | Apparent $\sigma_{h\alpha}$ |
|---|---|---|---|
| 0 | 34.72° | 4.71 | 9.234 |
| 1 | 39.21° | 1.916 | 4.752 |
| 2 | 41.74° | 1.968 | 4.890 |
| 3 | 43.22° | 1.992 | 4.975 |
| 4 | 44.11° | 2.005 | 5.029 |
| 5 | 44.65° | 2.013 | 5.060 |
| 6 | 44.99° | 2.017 | 5.083 |
| 7 | 45.19° | 2.020 | 5.095 |
| 8 | 45.32° | 2.021 | 5.104 |
| 9 | 45.40° | 2.022 | 5.109 |
| True Values | 45.00° | 2.000 | 5.000 |

A close examination of Table I reveals that there exists an optimal iteration number for each formation parameter beyond which the accuracy of apparent formation parameter actually decreases. For a given triad sonde, the optimal number of iterations for a given parameter can be calculated with the following method. For the three formation parameters, their corresponding error functions are defined as:

$$\varepsilon_\alpha = \sum_\alpha \sum_{\sigma_h} \sum_\lambda \left(\frac{\alpha - \alpha_a}{\alpha}\right)^2 \quad (38\text{-a})$$

$$\varepsilon_\lambda = \sum_\alpha \sum_{\sigma_h} \sum_\lambda \left(\frac{\lambda - \lambda_a}{\lambda}\right)^2 \quad (38\text{-b})$$

$$\varepsilon_{\sigma_h} = \sum_\alpha \sum_{\sigma_h} \sum_\lambda \left(\frac{\sigma_h - \sigma_{ha}}{\sigma_a}\right)^2 \quad (38\text{-c})$$

The summations are performed over the range of expected formation dip angles, conductivities, and anisotropy coefficients. This error function is consequently indicative of the overall residual error.

Figure 4:
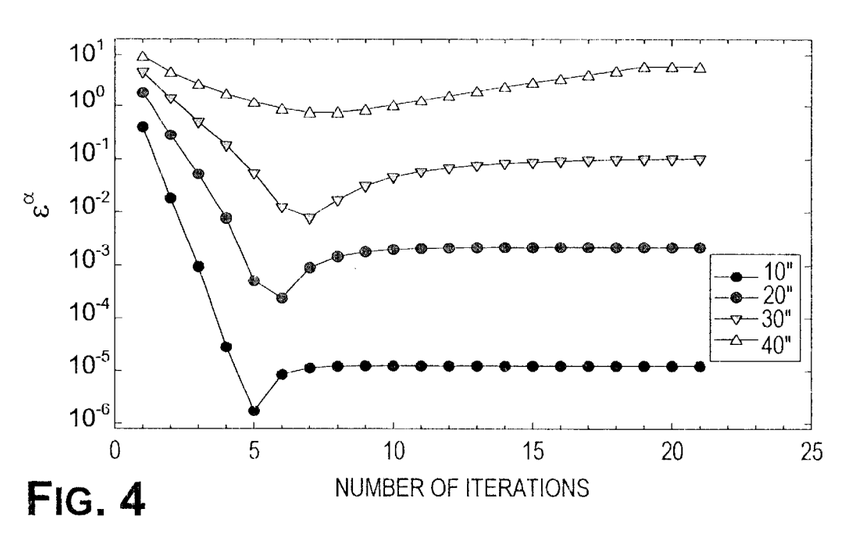
FIG. 4 shows a graph used to determine the optimal number of iterations that minimize a dip-angle error function.

Given a configuration of a triad sonde, the functional dependence of the error function on the number of iterations can be examined. FIG. 4 shows the apparent dip angle examination results for four triad-pair configurations having different transmitter-receiver spacings. The error function is calculated over the following ranges of formation parameters:

α=(5, 15, 30, 45, 60, 75, 85°)

$\sigma_h$=(0.001, 0.01, 0.02, 0.05, 0.1, 0.2, 0.5, 1, 2, 5, 10 S/m)

λ=(1.1, 1.414, 2, 4, 6, 8, 10).

The optimal iteration number is defined as the iteration number at which the error is minimal. This can similarly be done for the anisotropy coefficient λ and horizontal conductivity $\sigma_h$ to obtain their respective optimal iteration numbers.

Figure 5:
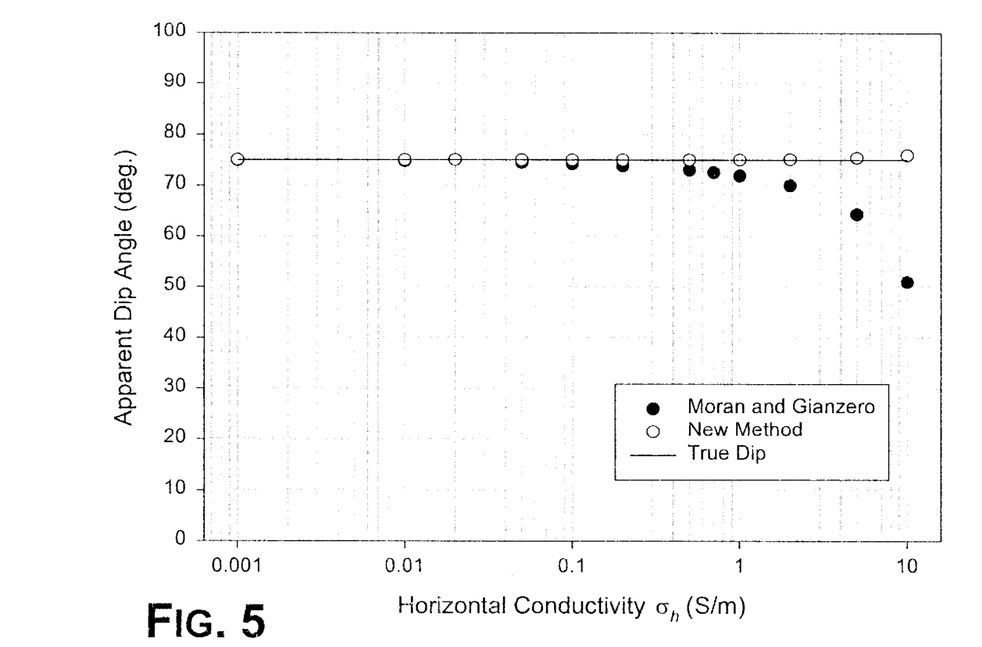
FIG. 5 compares the results of the disclosed method to results obtained with an existing method.

With the optimal iteration number determined, the advantage of the current invention in the dip angle determination over an existing method (Moran and Gianzero, Geophysics, Vol. 44, P. 1266, 1979) can be demonstrated. FIG. 5 plots the calculated dip angle measured in dipping formations having different horizontal conductivities. The true dip angle of the formation is 75 degrees. It is noted that the original method proposed by Moran and Gianzero has large errors in conductive formations due to the skin effect, while the disclosed method yields a calculated dip angle close to the true dip of 75 degrees. It is further emphasized that in addition to a more accurate dip angle, the current method also yields the other formation parameters illustrated in Table I.

Numerous variations and modifications will become apparent to those skilled in the art once the above disclosure is fully appreciated. It is intended that the following claims be interpreted to embrace all such variations and modifications.

What is claimed is:

1. A method for determining conductivity in a formation, wherein the method comprises:

measuring a magnetic coupling between transmitter coils and receiver coils of a tool in a borehole traversing the formation;

obtaining from the measured coupling a strike angle between the tool and the formation;

obtaining from the measured coupling an initial dip angle between the tool and the formation;

obtaining from the measured coupling an initial anisotropic factor of the formation;

obtaining from the measured coupling an initial horizontal conductivity of the formation;

determining an iterative anisotropic factor from the measured coupling, the strike angle, the latest dip angle, and the latest anistropic factor;

determining an iterative horizontal conductivity from the measured coupling, the strike angle, the latest iterative anisotropic factor, and the latest dip angle; and determining an iterative dip angle from the measured coupling, the latest iterative anisotropic factor, and the latest iterative horizontal conductivity.

2. The method of claim 1, further comprising:

repeating the steps of determining an iterative anisotropic factor, determining an iterative horizontal conductivity, and determining an iterative dip angle.

3. The method of claim 2, wherein said repeating is performed a number of times that minimizes an overall residual error.

4. The method of claim 1, wherein the strike angle $\beta$ corresponds to $$\beta = \tan^{-1}\left[\frac{(T_z R_y)_x}{(T_z R_x)_x}\right],$$

wherein $(T_z R_y)_X$ is the reactive component of the coupling $T_z R_y$ between a transmitter $T_z$ oriented along a z-axis and a receiver $R_y$ oriented along a y-axis, and $(T_z R_x)_X$ is the reactive component of the coupling $T_z R_x$ between transmitter $T_z$ and a receiver $R_x$ oriented along an x-axis.

5. The method of claim 1, wherein the initial dip angle $\alpha_1$ corresponds to $$\alpha_1 = \tan^{-1}\left[\sqrt{\left[\frac{(T_x R_y)_x}{(T_z R_x)_x}\right]^2 + \left[\frac{(T_x R_y)_x}{(T_z R_y)_x}\right]^2}\right],$$

wherein $(T_x R_y)_X$ is the reactive component of the coupling $T_x R_y$ between a transmitter $T_x$ oriented along an x-axis and a receiver $R_y$ oriented along a y-axis, $(T_z R_x)_X$ is the reactive component of the coupling $T_z R_x$ between a transmitter $T_z$ oriented along a z-axis and a receiver $R_x$ oriented along the x-axis, and $(T_z R_y)_X$ is the reactive component of the coupling $T_z R_y$ between transmitter $T_z$ and receiver $R_y$.

6. The method of claim 1, wherein the initial anisotropic factor $A_1$ corresponds to $$A_1 = \frac{1}{1 + \frac{(T_z R_x)_X - (T_z R_x)_R}{(T_z R_z)_X - (T_z R_z)_R} \cdot \frac{\tan\alpha_1}{\cos\beta}},$$

wherein $(T_z R_x)_X$ and $(T_z R_x)_R$ are the imaginary and real components, respectively, of the coupling $T_z R_x$ between a transmitter $T_z$ oriented along a z-axis and a receiver $R_x$ oriented along an x-axis, $(T_z R_z)_X$ and $(T_z R_z)_R$ are the imaginary and real components, respectively, of the coupling $T_z R_z$ between transmitter $T_z$ and a receiver $R_z$ oriented along the z-axis, $\alpha_1$ is the initial dip angle, and $\beta$ is the strike angle.

7. The method of claim 1, wherein the initial horizontal conductivity $\sigma_{h1}$ corresponds to $$\sigma_{h1} = K_1 \frac{[(T_z R_x)_X - (T_z R_x)_R]}{A_1},$$

wherein $(T_z R_x)_X$ and $(T_z R_x)_R$ are the imaginary and real components, respectively, of the coupling $T_z R_x$ between a transmitter $T_z$ oriented along a z-axis and a receiver $R_x$ oriented along an x-axis, $A_1$ is the initial anisotropic factor, and $K_1$ is a predetermined function of transmitter signal voltage and frequency.

8. The method of claim 1, wherein the iterative anisotropic factor $A_{i+1}$ corresponds to $$A_{i+1} = \frac{1}{1 + \frac{(T_z R_x)_X - (T_z R_x)_R - \Gamma_{zx}}{(T_z R_z)_X - (T_z R_z)_R - \Gamma_{zz}} \cdot \frac{\tan\alpha_i}{\cos\beta}},$$

wherein $(T_z R_x)_X$ and $(T_z R_x)_R$ are the imaginary and real components, respectively, of the coupling $T_z R_x$ between a transmitter $T_z$ oriented along a z-axis and a receiver $R_x$ oriented along an x-axis, $(T_z R_z)_X$ and $(T_z R_z)_R$ are the imaginary and real components, respectively, of the coupling $T_z R_z$ between transmitter $T_z$ and a receiver $R_z$ oriented along the z-axis, $\alpha_i$ is the latest dip angle, $\beta$ is the strike angle, $\Gamma_{zx}$ is a first skin-effect correction, and $\Gamma_{zz}$ is a second skin effect correction.

9. The method of claim 8, wherein the first skin-effect correction $\Gamma_{zx}$ corresponds to $$\Gamma_{zx} = K_2 \frac{\cos\beta \sin 2\alpha_i}{\sin^2\alpha_i}\left[\frac{2}{3}(1 - A_i^3)\left(\frac{L}{\delta_{hi}}\right)^4 + \frac{1}{3}(1 - A_i^4)\left(\frac{L}{\delta_{hi}}\right)^5\right]$$

and the second skin-effect correction corresponds to $$\Gamma_{zz} = 2K_2 \cdot \left[-\frac{1}{3}(1 + 2A_i^3)\left(\frac{L}{\delta_{hi}}\right)^4 + \frac{(3 + 5A_i^2)}{15}\left(\frac{L}{\delta_{hi}}\right)^5\right],$$

wherein L is a distance between the transmitter and receiver, $A_i$ is the latest anistropic factor, $\delta_{hi} = \sqrt{2/\omega\mu\sigma_{hi}}$ is the latest skin depth, $\sigma_{hi}$ is the latest horizontal conductivity, and $K_2$ is a predetermined function of transmitter signal voltage.

10. The method of claim 1, wherein the iterative horizontal conductivity $\sigma_{h(i-1)}$ corresponds to $$\sigma_{h(i+1)} = K_1 \frac{[(T_z R_x)_X - (T_z R_z)_R]}{A_{i+1}},$$

wherein $(T_z R_x)_X$ and $(T_z R_x)_R$ are the imaginary and real components, respectively, of the coupling $T_z R_x$ between a transmitter $T_z$ oriented along a z-axis and a receiver $R_x$ oriented along an x-axis, $A_{i-1}$ is the latest anisotropic factor, L is a distance between the transmitter and receiver, and $K_1$ is a predetermined function of transmitter signal voltage and frequency.

11. The method of claim 1, wherein the iterative dip angle $\alpha_{i+1}$ corresponds to $$\alpha_{i+1} = \tan^{-1}\left(\sqrt{\left[\frac{(T_xR_y)_R - (\Delta_{xy})_R}{(T_zR_x)_R - (\Delta_{zx})_R}\right]^2 + \left[\frac{(T_xR_y)_R - (\Delta_{xy})_R}{(T_zR_y)_R - (\Delta_{zy})_R}\right]^2}\right),$$

wherein $(T_xR_y)_R$ is the real component of the coupling $T_xR_y$ between a transmitter $T_x$ oriented along an x-axis and a receiver $R_y$ oriented along a y-axis, $(T_zR_x)_R$ is the real component of the coupling $T_zR_x$ between a transmitter $T_z$ oriented along a z-axis and a receiver $R_x$ oriented along the x-axis, $(T_zR_y)_R$ is the real component of the coupling $T_zR_y$ between transmitter $T_z$ and receiver $R_y$, $(\Delta_{xy})_R$ is a first correction term, $(\Delta_{zx})_R$ is a second correction term, and $(\Delta_{zy})_R$ is a third correction term.

12. The method of claim 11, wherein the first correction term $(\Delta xy)_R$ corresponds to $$(\Delta_{xy})_R = \frac{M\sin 2\beta}{2\pi L^3}\left[-P(\alpha_i)\left(\frac{L}{\delta_{h(i+1)}}\right)^4 + Q(\alpha_i)\left(\frac{L}{\delta_{h(i+1)}}\right)^5\right],$$

with $$P(\alpha_i) = \frac{(A_{i+1}^3 - 1)}{6}\frac{(1+\cos^2\alpha_i)}{\sin^2\alpha_i} + \frac{A_{i+1}^2}{6}\frac{(A_{i+1}^2 - \cos^2\alpha_i)}{\sin^2\alpha_i} - \frac{1}{2},$$

and $$Q(\alpha_i) = \frac{(A_{i+1}^4 - 1)}{24}\frac{(1+\cos^2\alpha_i)}{\sin^2\alpha_i} + \frac{A_{i+1}^2}{6}\frac{(A_{i+1}^2 - \cos^2\alpha_i)}{\sin^2\alpha_i} - \frac{1}{6},$$

wherein the second correction term $(\Delta_{zx})_R$ corresponds to $$(\Delta_{zx})_R = \frac{M}{8\pi L^3}\frac{\cos\beta\sin(2\alpha_i)}{\sin^2\alpha_i}\left[\frac{2}{3}(1 - A_{i+1}^3)\left(\frac{L}{\delta_{h(i+1)}}\right)^4 + \frac{1}{6}(A_{i+1}^4 - 1)\left(\frac{L}{\delta_{h(i+1)}}\right)^5\right],$$

and wherein the third correction term $(\Delta zy)_R$ corresponds to $$(\Delta_{zy})_R = \frac{M}{8\pi L^3}\frac{\sin\beta\sin(2\alpha_i)}{\sin^2\alpha_i}\left[\frac{2}{3}(1 - A_{i+1}^3)\left(\frac{L}{\delta_{h(i-1)}}\right)^4 + \frac{1}{6}(A_{i+1}^4 - 1)\left(\frac{L}{\delta_{h(i+1)}}\right)^5\right],$$

wherein $\alpha_i$ is the latest dip angle, $\beta$ is the strike angle, L is a distance between the transmitter and receiver, $A_{i-1}$ is the latest anistropic factor, $\delta_{h(i+1)} = \sqrt{2/\omega\mu\sigma_{h(i+1)}}$ is the latest skin depth, $\sigma_{h(i+1)}$ is the latest horizontal conductivity, and $K_2$ is a predetermined function of transmitter signal voltage.

13. The method of claim 1, wherein the transmitter coils consist of a triad of mutually orthogonal transmitters.

14. The method of claim 13, wherein the receiver coils consist of a triad of mutually orthogonal receivers.

15. The method of claim 1, wherein said measuring includes exciting each transmitter coil in turn and measuring in-phase and quadrature phase voltage signals induced in each of the receiver coils by each of the transmitter coils.

16. A method for determining conductivity in a formation, wherein the method comprises:

receiving magnetic coupling measurements from an induction tool;

obtaining from the magnetic coupling measurements an initial horizontal conductivity of the formation;

determining an iterative horizontal conductivity from the magnetic coupling measurements and the initial horizontal conductivity of the formation, wherein the initial horizontal conductivity $\sigma_{h1}$ corresponds to $$\sigma_{hI} = K_1\frac{[(T_zR_x)_X - (T_zR_x)_R]}{A_1},$$

wherein $K_1$ is a predetermined function of transmitter signal voltage and frequency, $(T_zR_x)_X$ and $(T_zR_x)_R$ are the imaginary and real components, respectively, of the magnetic coupling measurement $T_zR_x$ between a transmitter $T_z$ oriented along a z-axis and a receiver $R_x$ oriented along an x-axis, and $A_1$ is the initial anisotropic factor corresponding to $$A_1 = \frac{1}{1 + \frac{(T_zR_x)_X - (T_zR_x)_R}{(T_zR_z)_X - (T_zR_z)_R} \cdot \frac{\tan\alpha_1}{\cos\beta}},$$

wherein the strike angle $\beta$ corresponds to $$\beta = \tan^{-1}\left[\frac{(T_zR_y)_x}{(T_zR_x)_x}\right],$$

and the initial dip angle $\alpha_1$ corresponds to $$\alpha_1 = \tan^{-1}\left(\sqrt{\left[\frac{(T_xR_y)_x}{(T_zR_x)_x}\right]^2 + \left[\frac{(T_xR_y)_x}{(T_zR_y)_x}\right]^2}\right),$$

wherein $(T_zR_z)_X$ and $(T_zR_z)_R$ are the imaginary and real components, respectively, of the coupling $T_zR_z$ between transmitter $T_z$ and a receiver $R_z$ oriented along the z-axis, wherein $(T_xR_y)_X$ is the reactive component of the coupling $T_xR_y$ between a transmitter $T_x$ oriented along the x-axis and a receiver $R_y$ oriented along a y-axis, wherein $(T_zR_y)_X$ is the reactive component of the coupling $T_zR_y$ between transmitter $T_z$ and receiver $R_y$.

17. A method for determining conductivity in a formation, wherein the method comprises:

receiving magnetic coupling measurements from an induction tool;

obtaining from the magnetic coupling measurements an initial horizontal conductivity of the formation;

determining an iterative horizontal conductivity from the magnetic coupling measurements and the initial horizontal conductivity of the formation, wherein the iterative horizontal conductivity $\sigma_{h(i+1)}$ corresponds to $$\sigma_{h(i+1)} = K_1\frac{[(T_zR_x)_X - (T_zR_x)_R]}{A_{i+1}},$$

wherein $K_1$ is a predetermined function of transmitter signal voltage and frequency, wherein $(T_zR_x)_X$ and $(T_zR_x)_R$ are the imaginary and real components, respectively, of the coupling $T_zR_x$ between a transmitter $T_z$ oriented along a z-axis and a receiver $R_x$ oriented along an x-axis, and $A_{i+1}$ corresponds to $$A_{i+1} = \cfrac{1}{1 + \cfrac{(T_zR_x)_X - (T_zR_x)_R - \Gamma_{zx}}{(T_zR_z)_X - (T_zR_z) - \Gamma_{zz}} \cdot \cfrac{\tan\alpha_i}{\cos\beta}},$$

wherein $(T_zR_z)_X$ and $(T_zR_z)_R$ are the imaginary and real components, respectively, of the coupling $T_zR_z$ between transmitter $T_z$ and a receiver $R_z$ oriented along the z-axis, $\Gamma_{zx}$ is a first skin-effect correction, $\Gamma_{zz}$ is a second skin effect correction, the strike angle $\beta$ corresponds to $$\beta = \tan^{-1}\left[\frac{(T_zR_y)_x}{(T_zR_x)_x}\right],$$

and the dip angle $\alpha_i$ corresponds to $$\alpha_i = \tan^{-1}\left(\sqrt{\left[\frac{(T_zR_y)_R - (\Delta_{xy})_R}{(T_zR_x)_R - (\Delta_{zx})_R}\right]^2 + \left[\frac{(T_xR_y)_R - (\Delta_{xy})_R}{(T_zR_y)_R - (\Delta_{zy})_R}\right]^2}\right),$$

wherein $(T_zR_y)_X$ and $(T_zR_y)_R$ are the imaginary and real components, respectively, of the coupling $T_zR_y$ between transmitter $T_z$ and a receiver $R_y$ oriented along a y-axis, $(T_xR_y)_R$ is the real component of the coupling $T_xR_y$ between a transmitter $T_x$ oriented along the x-axis and receiver $R_y$, $(\Delta_{xy})_R$ is a first correction term, $(\Delta_{zx})_R$ is a second correction term, and $(\Delta_{zy})_R$ is a third correction term.

18. The method of claim 17, wherein the first skin-effect correction $\Gamma_{zx}$ corresponds to $$\Gamma_{zx} = K_2\frac{\cos\beta\sin\alpha_i}{\sin^2\alpha_i}\left[\frac{2}{3}(1 - A_i^3)\left(\frac{L}{\delta_{hi}}\right)^4 + \frac{1}{3}(1 - A_i^4)\left(\frac{L}{\delta_{hi}}\right)^5\right]$$

and the second skin-effect correction corresponds to $$\Gamma_{zz} = 2K_2 \cdot \left[-\frac{1}{3}(1 + 2A_i^3)\left(\frac{L}{\delta_{hi}}\right)^4 + \frac{(3 + 5A_i^2)}{15}\left(\frac{L}{\delta_{hi}}\right)^5\right],$$

wherein L is a distance between the transmitter and receiver, $A_i$ is the latest anistropic factor, $\delta_{hi}=\sqrt{2/\omega\mu\sigma_{hi}}$ is the latest skin depth, $\sigma_{hi}$ is the latest horizontal conductivity, and $K_2$ is a predetermined function of transmitter signal voltage.

19. The method of claim 17, wherein the first correction term $(\Delta_{xy})_R$ corresponds to $$(\Delta_{xy})_R = \frac{M\sin2\beta}{2\pi L^3}\left[-P(\alpha_{i-1})\left(\frac{L}{\delta_{hi}}\right)^4 + Q(\alpha_{i-1})\left(\frac{L}{\delta_{hi}}\right)^5\right],$$

with $$P(\alpha_i) = \frac{(A_{i+1}^3 - 1)}{6}\frac{(1 + \cos^2\alpha_i)}{\sin^2\alpha_i} + \frac{A_{i+1}}{6}\frac{(A_{i+1}^2 - \cos^2\alpha_i)}{\sin^2\alpha_i} - \frac{1}{2},$$

and $$Q(\alpha_i) = \frac{(A_{i+1}^4 - 1)}{24}\frac{(1 + \cos^2\alpha_i)}{\sin^2\alpha_i} + \frac{A_{i+1}^2}{6}\frac{(A_{i+1}^2 - \cos^2\alpha_i)}{\sin^2\alpha_i} - \frac{1}{6},$$

wherein the second correction term $(\Delta zx)_R$ corresponds to $$(\Delta_{zx})_R = \frac{M}{8\pi L^3}\frac{\cos\beta\sin(2\alpha_{i-1})}{\sin^2\alpha_{i-1}}\left[\frac{2}{3}(1 - A_i^3)\left(\frac{L}{\delta_{hi}}\right)^4 + \frac{1}{6}(A_i^4 - 1)\left(\frac{L}{\delta_{hi}}\right)^5\right],$$

and wherein the third correction term $(\Delta zy)_R$ corresponds to $$(\Delta_{zy})_R = \frac{M}{8\pi L^3}\frac{\sin\beta\sin(2\alpha_{i-1})}{\sin^2\alpha_{i-1}}\left[\frac{2}{3}(1 - A_i^3)\left(\frac{L}{\delta_{hi}}\right)^4 + \frac{1}{6}(A_i^4 - 1)\left(\frac{L}{\delta_{hi}}\right)^5\right],$$

wherein $\alpha_i$ is the latest dip angle, $\beta$ is the strike angle, L is a distance between the transmitter and receiver, $A_i$ is the latest anistropic factor, $\delta_{hi}=\sqrt{2/\omega\mu\sigma_{hi}}$ is the latest skin depth, $\sigma_{hi}$ is the latest horizontal conductivity, $K_2$ is a predetermined function of transmitter signal voltage.

\* \* \* \* \*